(12) United States Patent
Chikanari et al.

(10) Patent No.: US 6,699,934 B2
(45) Date of Patent: Mar. 2, 2004

(54) RESIN COMPOSITION AND FILM THEREOF

(75) Inventors: Kenzo Chikanari, Ichihara (JP); Satoru Koyama, Sodegaura (JP); Daigo Nakanishi, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 21 days.

(21) Appl. No.: 09/925,506

(22) Filed: Aug. 10, 2001

(65) Prior Publication Data

US 2002/0065370 A1 May 30, 2002

(30) Foreign Application Priority Data

Sep. 29, 2000 (JP) .......................... 2000-299324

(51) Int. Cl.⁷ .......................... C08L 23/00; C08L 23/04; C08L 27/10; C08L 37/00; C08L 41/00
(52) U.S. Cl. .................. 525/191; 525/206; 525/207; 525/208; 525/220; 525/221; 525/222; 525/223; 525/225; 525/226; 525/227; 525/228; 525/229; 525/231
(58) Field of Search .................. 525/191, 206, 525/207, 208, 220, 221, 222, 223, 224, 225, 226, 227, 228, 229, 231

(56) References Cited

U.S. PATENT DOCUMENTS

| | | | | |
|---|---|---|---|---|
| 4,503,102 A | * | 3/1985 | Mollison | 206/524.9 |
| 4,987,191 A | | 1/1991 | Hayashida et al. | |
| 5,426,153 A | * | 6/1995 | Mirabella et al. | 525/222 |

FOREIGN PATENT DOCUMENTS

| | | |
|---|---|---|
| EP | 0 679 685 A1 | 11/1995 |
| JP | 61-106645 | 5/1986 |
| JP | 2-4846 | 1/1990 |
| JP | 7-292174 | 11/1995 |
| JP | 8-283480 | 10/1996 |

* cited by examiner

*Primary Examiner*—Nathan M. Nutter
(74) *Attorney, Agent, or Firm*—Sughrue Mion, PLLC

(57) ABSTRACT

There is provided a resin composition comprising;

(A) from 1 to 99% by weight of a copolymer, which comprises an ethylene unit and an α-olefin unit of 3 to 12 carbon atoms, and satisfies the specific requirements (A-1) to (A-4), and (B) from 99 to 1% by weight of a copolymer, which comprises an ethylene unit and a unit of a compound having a carbon-carbon double bond and an oxygen atom, and satisfies the specific requirements (B-1) and (B-2).

6 Claims, No Drawings

RESIN COMPOSITION AND FILM THEREOF

FIELD OF THE INVENTION

The present invention relates to a resin composition and a film thereof, which is low in glossiness, low in transparency, superior in tear strength, of pliable silk cloth-like feel, and low in loudness when crumpled by hands.

BACKGROUND OF THE INVENTION

Many of polyethylene films used as materials for packaging have high glossiness to obtain a superior appearance, high transparency to make packaged goods visible, as well as physical properties such as superior tear strength.

However, depending upon application purposes, the glossiness and high-transparency are not required. When used for the packaging of sanitary goods such as tissue paper, diaper paper and other goods, such as disposable rain wears and medical sheets, and polyethylene gloves used in places such as kitchens, factories, food stores, hotels' and hospitals, a polyethylene film is desired to be superior in tear strength, and in addition to, low glossiness, low transparency, a pliable silk cloth-like feel, and low loudness when crumpled by hand.

With respect to resin compositions and films with which the present invention is concerned, JP-A 61-106645 discloses a film of a mixture of ethylene-vinyl acetate copolymer and polyethylene; JP-A 2-4846 discloses a film of a mixture of ethylene-(meth)acrylate copolymer and polyethylene; JP-A 7-292174 discloses a resin composition comprising ethylene-1-hexene copolymer obtained by using a metallocene catalyst and ethylene-vinyl acetate copolymer, and a film of said resin composition; and JP-A 8-283480 discloses a resin composition comprising ethylene copolymer obtained using a metallocene catalyst, ethylene-vinyl ester copolymer and an anti-blocking agent.

However, the films disclosed in JP-A 61-106645 and JP-A 2-4846 are not satisfactory with respect to the low-glossiness, low-transparency and tear strength, and the films of the resin compositions disclosed in JP-A 7-292174 and JP-A 8-283480 are too transparent.

SUMMARY OF THE INVENTION

An object of the present invention is to provide a film, which is low in glossiness, low in transparency, superior in tear strength, pliable with a silk cloth-like feel, and low in loudness when crumpled by hands.

Another object of the present invention is to provide a resin composition capable of providing such a film.

The present invention provides a resin composition comprising;

(A) from 1 to 99% by weight of a copolymer, which comprises an ethylene unit and an a-olefin unit of 3 to 12 carbon atoms and, (B) from 99 to 1% by weight of a copolymer, which comprises an ethylene unit and a unit of a compound having a carbon-carbon double bond and an oxygen atom, provided that the sum of the copolymer (A) and the copolymer (C) is 100% by weight, wherein the copolymer (A) satisfies the following requirements (A-1) to (A-4), and the copolymer (B) satisfies the following requirements (B-1) and (B-2), (A-1): a melt flow rate (MFR) is from 0.1 to 50 g/10 min, (A-2): a density (d) is from 880 to 935 Kg/m$^3$, (A-3): a composition distribution variation coefficient (Cx) represented by the following equation (1) is not more than 0.5, $$Cx = \sigma/SCBave \quad (1)$$

wherein σ is a standard deviation of composition distribution, and SCBave is an average branching degree, (A-4): a content (a) of cold xylene-soluble portion in terms of % by weight based on the weight of the copolymer (A) and the density (d) satisfy the following inequality (2), $$a < 4.8 \times 10^{-5} \times (950-d)^3 + 10^{-6} \times (950-d)^4 + 1 \quad (2).$$

(B-1): a melt flow rate (MFR) is from 0.01 to 50 g/10 min, and (B-2): a content (b) of a unit of a compound having a carbon-carbon double bond and an oxygen atom in terms of % by weight based on the weight of the sum of the ethylene unit and the unit of a compound having a carbon-carbon double bond and an oxygen atom, and a content (WB) of the copolymer (B) in the resin composition in terms of % by weight based on the weight of the sum of the copolymer (A) and the copolymer (B) satisfy the following inequality (3), $$50 > b > 0.2 \times WB + 10 \quad (3).$$

The present invention also provides a film comprising the above-mentioned resin composition.

DETAILED DESCRIPTION OF THE INVENTION

The copolymer (A) used in the present invention, which is, according to circumstances, referred to as "component (A)", can be obtained by copolymerizing ethylene and at least one α-olefin of 3 to 12 carbon atoms. The above mentioned "ethylene unit" means a structure unit derived from ethylene. Similarly, the above-mentioned "α-olefin unit of 3 to 12 carbon atoms" means a structure unit derived from said a-olefin.

Examples of the above-mentioned α-olefin are propylene, butene-1, pentene-1, hexene-1, heptene-1, octene-1, nonene-1, decene-1, dodecene-1, 4-methyl-pentene-1, 4-methyl-hexene-1 and vinylcyclohexane. Of these, preferred are butene-1, hexene-1 and octene-1, and more preferred is hexene-1.

Examples of the copolymer (A) are ethylene-propylene copolymer, ethylene-butene-1 copolymer, ethylene-hexene-1 copolymer and ethylene-octene-1 copolymer. Of these, ethylene-hexene-1 copolymer is preferred.

A melt flow rate (MFR) of the copolymer (A) is from 0.1 to 50 g/10 min, preferably from 0.5 to 20 g/10 min, more preferably from 0.5 to 10 g/10 min, much more preferably from 2 to 5 g/10 min. When the melt flow rate is less than 0.1 g/10 min, the film from the obtained resin composition may be too heavy. When it exceeds 50 g/10 min, tear strength of the film obtained may decrease.

A density (d) of the copolymer (A) is from 880 to 935 Kg/m$^3$, preferably from 890 to 930 Kg/m$^3$, more preferably from 910 to 930 Kg/m$^3$. When the density is less than 880 Kg/m$^3$, rigidity of the film obtained may decrease, and as a result, the film may become unsuitable for packaging film from a viewpoint of a handling facility. When it exceeds 935 Kg/m$^3$, impact strength of the film obtained may decrease.

A composition distribution variation coefficient (Cx) represented by the above-mentioned equation (1) is not more than 0.5, preferably from 0.2 to 0.4. When the composition distribution variation coefficient exceeds 0.5, glossiness of the film in accordance with the present invention may increase, or tear strength and anti-blocking property thereof may deteriorate.

The composition distribution variation coefficient is a measure showing a distribution degree of the monomer unit in the copolymer (A). The smaller the Cx value, the narrower the composition distribution, in other words, the ethylene unit and the α-olefin unit are more uniformly distributed in the copolymer (A). A measurement method of the Cx value is mentioned hereinafter.

A content (a) (% by weight) of cold xylene-soluble portion and a density (d) of the copolymer (A) satisfy the above-mentioned inequality (2). A copolymer (A) satisfying the following inequality (4) is preferred, and a copolymer (A) satisfying the following inequality (5) is more preferred.

$$a < 4.8 \times 10^{-5} \times (950-d)^3 + 10^{-6} \times (950-d)^4 \quad (4)$$

$$a < 4.8 \times 10^{-5} \times (950-d)^3 \quad (5)$$

When the copolymer (A) does not satisfy the above inequality (2), tear strength of the film in accordance with the present invention may decrease, glossiness thereof may increase or anti-blocking property thereof may deteriorate.

A process for producing the copolymer (A) is not limited. The copolymer (A) can be produced according to a conventional process using a conventional catalyst. As the conventional catalyst, those containing a transition metal compound be used. A preferred conventional catalyst is that which contains a transitional metal compound having a cyclopentadiene type anion skeleton-carrying group, namely, a so-called metallocene compound. A more preferred metallocene compound is represented by the following formula,

$$ML_cX_{n-o}$$

wherein M is a transition metal atom belonging to the group 4 or the lanthanide series of the periodic table, L is a cyclopentadiene type anion skeleton-carrying group or a hetero atom-containing group, provided that at least one L is a cyclopentadiene type anion skeleton-carrying group, and plural L groups may be cross-linked with one another, X is a halogen atom or a hydrocarbon group of 1 to 20 carbon atoms, n is a valence of the transition metal atom, and c is an integer satisfying $0 < c \leq n$.

The above-mentioned transition metal compound may be used individually or in a mixture of two or more.

The above-mentioned catalyst containing the transition metal compound can be obtained by combination (1) to combination (4).

(1) A combination of the transition metal compound with an organoaluminum compound such as triethylaluminum and triisobutylaluminum.

(2) A combination of the transition metal compound with an almoxane compound such as methylalmoxane.

(3) A combination of the transition metal compound, an organoaluminum compound such as triethylaluminum and triisobutylaluminum, and an ionic compound such as tolytyltetraxispentafluorophenyl borate and N,N-dimethylanilium tetraxispentafluorophenyl borate.

(4) A combination of the transition metal compound, an almoxane compound such as methylalmoxane, and an ionic compound such as tolytyltetraxispentafluorophenyl borate and N,N-dimethylanilium tetraxispentafluorophenyl borate.

Such a catalyst may be supported on a carrier comprising particulate inorganic carriers such as $SiO_2$ and $Al_2O_3$, and particulate organic polymers such as polyethylene and polystyrene.

As a polymerization method of the copolymer (A), for example, solution polymerization, slurry polymerization, high-pressure ion polymerization and gas phase polymerization methods may be used. Of these, gas phase polymerization and high-pressure ion polymerization methods are preferred.

The "copolymer (B) comprising an ethylene unit and a unit of a compound having a carbon-carbon double bond and an oxygen atom and" used in the present invention, which is, according to circumstances, referred to as "component (B)", means a copolymer comprising an ethylene unit and a structure unit derived from a compound having a carbon-carbon double bond and an oxygen atom, which compound is copolymerizable with ethylene.

Examples of the compounds providing the unit of a compound having a carbon-carbon double bond and an oxygen atom are β-unsaturated carboxylic acid alkyl esters such as methyl acrylate, ethyl acrylate, butyl acrylate, methyl methacrylate, ethyl methacrylate and butyl methacrylate; carboxylicacidvinyl esters such as vinyl acetate, vinyl propionate, vinyl butanate and vinyl benzoate; and vinyl ethers such as methyl vinyl ether, ethyl vinyl ether and phenyl vinyl ether. Of these, methyl acrylate, ethyl acrylate, butyl acrylate, methyl methacrylate and vinyl acetate are preferred.

A melt flow rate of the copolymer (B) is from 0.01 to 50 g/10 min, preferably from 0.1 to 20 g/10 min, more preferably from 1.5 to 10 g/10 min. When the MFR is less than 0.01 g/10 min, its compatibility with the copolymer (A) may deteriorate. When it exceeds 50 g/10 min, tear strength of the film in accordance with the present invention may decrease.

A content (b) (% by weight) of a unit of a compound having a carbon-carbon double bond and an oxygen atom in the copolymer (B), and a content (WB) (% by weight) of the copolymer (B) in the resin composition in accordance with the present invention must satisfy the above inequality (3), preferably the following inequality (6), wherein b (% by weight) is based on 100% by weight of the sum of a content of an ethylene unit and a content of a unit of a compound having a carbon—carbon double bond and an oxygen atom, and WB (% by weight) is based on 100% by weight of the sum of contents of the copolymers (A) and (B) in the resin composition in accordance with the present invention.

$$50 > b > 0.7 \times WB + 10 \quad (6)$$

A value of b (% by weight) is less than 50% by weight as shown in the above inequalities (3) and (6), preferably not more than 40% by weight, more preferably not more than 30% by weight. When the value of b is not less than 50% by weight, tear strength of the film in accordance with the present invention may decrease. On the other hand, the value of b exceeds 0.2×WB+10, preferably 0.7×WB+10. When the value of b is not more than 0.2×WB+10, glossiness of the film in accordance with the present invention may increase.

A process for producing the copolymer (B) is not particularly limited. For example, ethylene and the compound having at least one carbon-carbon double bond and an oxygen atom are subjected to copolymerization in the presence of a radical generator under conditions of from 50 to 400 MPa and from 100 to 300° C., and, if desired, in the presence of a solvent and a chain transfer agent, which is called a high-pressure radical polymerization method. An average molecular weight of the copolymer (B) and contents of respective units contained in said copolymer can be controlled by adjusting the polymerization conditions.

The resin composition in accordance with the present invention comprises from 1 to 99% by weight of the copolymer (A) and from 99 to 1% by weight of the copolymer (B), preferably from 60 to 99% by weight of the copolymer (A) and from 40 to 1% by weight of the copolymer (B), more preferably from 70 to 99% by weight of the copolymer (A) and from 30 to 1% by weight of the copolymer (B), much more preferably from 85 to 994 by weight of the copolymer (A) and from 15 to 1% by weight of the copolymer (B), provided that the sum of the copolymer (A) and the copolymer (B) is 100% by weight.

When the content of the copolymer (A) is less than 1% by weight, glossiness of the film comprising the resin composition may increase, or impact strength thereof may decrease. When the content of the copolymer (A) exceeds 99% by weight, glossiness of said film may increase, or a film of pliable silk cloth-like feel may not be obtained.

The film in accordance with the present invention is a non-oriented film obtained by using the resin composition in accordance with the present invention. The film in accordance with the present invention has a haze value (an index of non-transparency) of preferably more than 20%, more preferably not less than 30%. The film in accordance with the present invention has a gloss value (an index of glossiness) of preferably less than 30%, more preferably not more than 25%, much more preferably not more than 15%.

A process for producing the resin composition in accordance with the present invention is not particularly limited. For example, the resin composition can be obtained according to a conventional blending method. According to the conventional blending method, for example, the copolymer (A) and the copolymer (B) are subjected to dry blend using a blender such as Henschell mixer and a tumbler mixer, or to melt blend using a mixer such as a single screw extruder, a twin screw extruder, Bumbury's mixer and a hot roll.

A process for producing the film in accordance with the present invention is not particularly limited, and may be a conventional one. As the conventional process, a tubular film process using a tubular film forming apparatus and a T die casting process using a T die cast film forming apparatus can be used. Of these, a tubular film process is preferred.

The film in accordance with the present invention can be used as at least one side surface layer of a multi-layer film. As materials of the other layer (substrate) constituting the multi-layer film, for example, cellophane, paper, cardboard, cloth, aluminum foil, polyamide resin such as nylon 6 and nylon 66, polyester resin such as polybutylene terephthalate polybutylene terephalate, and oriented polypropylene may be used.

A process for producing said multi-layer film is not particularly limited, and may be a conventional one. A process wherein the resin composition in accordance with the present invention and the above-mentioned material for the substrate are subjected to co-extrusion or extrusion coating, wherein the latter process is also called an extrusion laminating process. Alternatively, the multi-layer film can be obtained, for example, by laminating the film in accordance with the present invention (single layer film) on the above-mentioned substrate according to lamination processes such as dry lamination, wet lamination, sandwich lamination and hot melt lamination.

The film in accordance with the present invention and the above-mentioned multi-layer film can be particularly suitably used as materials for producing a film used for packaging sanitary goods such as tissue paper, paper diaper and goods of the body, and materials for producing a glove readily used in places such as kitchens, factories, food stores, hotels and hospitals.

A process for producing a glove is not particularly limited. For example, the glove can be produced according to a conventional process wherein two sheets of the film are placed one over the other, thereafter the periphery of the superimposed is heat-melt-bonded along a shape of hand, and then a portion corresponding to a wrist is made open.

If desired, the components (A) and (B) used in the present invention may be used in combination with additives such as antioxidants, lubricants, antistatic agents, processing improvers and anti-blocking agents.

Examples of the antioxidants are phenol antioxidants such as 2,6-di-t-butyl-p-cresol(BHT), tetraxis [methylene-3-(3,5-di-t-butyl-4-hydroxy-henyl) propionate]methane (a trade mark of IRGANOX 1010, manufactured by Ciba Specialty Chemicals K.K.) and n-octadecyl-3-(4'-hydroxy-3,5'-di-t-butylphenyl)propionate (a trade mark of IRGANOX 1076, manufactured by Ciba Specialty Chemicals K.K.); and phosphite antioxidants such as bis(2,4-di-t-butylphenyl) pentaerythritoldiphosphite and tris(2,4-di-t-butylphenyl) phosphite.

Examples of the lubricants are erucic amide, higher fatty acid amides and higher fatty acid esters. Examples of the antistatic agents are glycerol $C_8$ to $C_{22}$ fatty acid ester, sorbitan $C_8$ to $C_{22}$ fatty acid ester and polyethylene glycol $C_8$ to $C_{22}$ fatty acid ester. Examples of the processing improvers metal salts of fatty acids such as calcium stearate. Examples anti-blocking agents are silica, diatomaceous earth, calcium carbonate and talc.

A process for combining the copolymer (A) and the copolymer (B) with the additive is not limited. For example, the additive is added to a mixture of the copolymer (A) and the copolymer (B), or separately added to each one of the copolymer (A) and the copolymer (B). Alternatively, the additive may be added to a master batch of the copolymer (A) or the copolymer (B).

EXAMPLE

The present invention is explained with reference to Examples, which are not intended to limit the scope of the present invention.

The following components (A1) to (A3) were used, and characteristics thereof are as shown in Table 1.

Component (A1)

Ethylene-hexene-1 copolymer, a trade mark of SUMIKATHENE E FV403, manufactured and sold by Evolue Japan Co., Ltd. and Sumitomo Chemical Co., Ltd., respectively.

Component (A2)

Ethylene-hexene-1 copolymer, a trade mark of SUMIKATHENE α FZ201-0, manufactured by Sumitomo Chemical Co., Ltd.

Component (A3)

Ethylene-butene-1 copolymer, a trade mark of SUMIKATHENE I. FS240, manufactured by Sumitomo Chemical Co., Ltd.

The following components (B1) to (B5) were used, and characteristics thereof are as shown in Table 2.

Component (B1)

Ethylene-vinyl acetate copolymer, a trade mark of EVATATE 10 H2011, manufactured by Sumitomo Chemical Co., Ltd.

Component (B2)

Ethylene-vinyl acetate copolymer, a trade mark of EVATATE H2031, manufactured by Sumitomo Chemical Co., Ltd.

Component (B3)

Ethylene-methyl methacrylate copolymer, a trade mark of ACRYFT WK307, manufactured by Sumitomo Chemical Co., Ltd.

Component (B4)

Ethylene-vinyl acetate copolymer, a trade mark of EVATATE D2021F, manufactured by Sumitomo Chemical Co., Ltd.

Component (B5)

Ethylene copolymer produced according to a high pressure process, a trade mark of SUMIKATHENE F-200-0, manufactured by Sumitomo Chemical Co., Ltd.

Physical properties described in Examples and Comparative Examples were measured as follows.

1. Density (d) (Kg/m$^3$)

It was measured according to a process prescribed in JIS K6760.

2. Melt flow rate (MFR) (g/10 min)

It was measured at 190l under a load of 2.16 kg according to a process prescribed in JIS K6760.

3. Composition distribution variation coefficient (Cx)

It was measured by using a multifunction LC (Liquid Chromatography) manufactured by Tosoh Corporation according to a process comprising the following steps (1) to (7).

(1) A sample is dissolved in o-dichlorobenzene (ODCB) heated at 145° C. to obtain a solution having a concentration of 0.2 g/20 ml.

(2) The solution is introduced in a column of a column oven, in which sea sand is filled.

(3) A temperature of the oven is lowered from 145° C. to 125° C. at a rate of 40° C./60 minutes, and further lowered from 125° C. to −15° C. over 14 hours.

(4) The temperature of the oven is raised from −15° C. to 125° C. at a rate of 10° C./60 minutes, and a relative concentration of sample in the solution continuously effused from the column during the temperature-raising process is measured with use of an FT-IR connected to the column. Here, the relative concentration is measured 7 times at equal intervals during the time that the oven temperature is raised by 10° C. (for example, during the time that the oven temperature is raised from −15° C. to −5° C.), and a final temperature of the measurement is fix to be a temperature (about 97° C.) at which the SCB value according to the following equation (7) is found to be almost 0. The reason why the oven temperature is raised to 125° C. is to completely effuse the sample from the column.

(5) On the other hand, a branching degree (SCB) per 1000 carbon atoms of a principal chain in each temperature (each effusion temperature) at which the relative concentration is measured is determined from the following equation (7) regardless of a kind of the comonomer.

$$SCB = -0.7322 \times \text{effusion temperature}(° C.) + 70.68 \quad (7)$$

(6) With respect to each temperature at which the relative concentration is measured, the branching degree obtained in the above item (5) and the relative concentration obtained in the above item (4) are plotted to enter the horizontal axis and the vertical axis, respectively, thereby obtaining a curve (composition distribution curve).

(7) From the curve, an average branching degree per 1000 carbon atoms (SCBave) and a standard deviation (σ) of composition distribution are obtained, and from the following equation (1), a fluctuation coefficient (Cx) of composition distribution is determined.

$$Cx = \sigma/SCBave \quad (1)$$

Here:

Average branching degree (SCBave.) = ΣN(i)×W(i)

Standard deviation (σ) of composition distribution
= {Σ(N(i)−SCBave)$^{2 \times W(i)}$}$^{0.5}$ N(i): Branching degree at No. i measuring point.

W(i): Relative concentration at No. i measuring point (ΣW(i)=1).

4. Content of cold xylene-soluble portion (a) (% by weight)

t was measured according to a process prescribed in § 175.1520 of U.S. Code of Federal Regulations, Food and Drugs Administration.

5. Haze value (%)

It was measured according to a process prescribed in ASTM D1003. The larger the value, the lower the transparency.

6. Gloss value

It was measured according to a process prescribed in JIS Z8741. The smaller the value, the lower the glossiness.

7. Content of unit of compound having carbon-carbon double bond and oxygen atom in the copolymer (B) (% by weight)

(1) A content of vinyl acetate unit was measured according to a process prescribed in JIS K6730-1981.

(2) A content of methyl methacrylate unit was measured according to the following process.

The copolymer (B) was pressed to obtain a sheet of 0.3 mm thickness, and an infrared absorption spectrum of the sheet was measured using an infrared spectrophotometer, FT/IR-7300 Type, manufactured by JASCO Corporation. Using a peak of 3448 cm-1 attributed to methyl methacrylate as a characteristic absorption, a content of the methyl methacrylate unit was determined from the following equation (9) comprising compensation for the absorbancy by the thickness. In this equation, I is an intensity of transmitting light at 3448 cm$^{-1}$, $I_0$ is an intensity of incident light at 3448 cm$^{-1}$, and t (cm) is a thickness of the sheet. Content of methyl methacrylate unit (% by weight)

$$= 4.1 \times \log (T_0/I)/t - 5.3 \quad (9)$$

8. Tear strength (kN/m)

It was measured according to a process prescribed in ASTM D1922.

Examples 1 to 7

Components shown in Table 3 were mixed in blending proportions shown in that Table with a tumbler mixer. Using a film molding machine composed of a 50 mm φ extruding machine and a blow molding machine (diameter of die=120 mm φ, lip opening=2.0 mm), manufactured by Placo Co., Ltd., the resulting mixtures were processed under conditions of a processing temperature of 140° C., an output of 25 kg/hr and a blow ratio of 2.3, thereby obtaining respective non-oriented films of 60 μm thickness. Physical properties of the films are as shown in Table 3. The films obtained were found to have pliable silk cloth-like feel and low in loudness when crumpled by hands.

Comparative Examples 1 to 4

The same manner as in Examples was repeated, except that components shown in Table 4 were used in blending proportions shown in that Table, thereby obtaining respective non-oriented films. Each thickness of the films obtained in Comparative Examples 1 to 3 was 60 μm, and a thickness of the film obtained in Comparative Example 4 was 50 μm. Physical properties of the films are as shown in Table 4.

From Table 3, it is apparent that the films obtained in Examples 1 to 7 are low in their glossiness, low in transparency and superior in their tear strength.

Contrary thereto, Table 4 demonstrates as follows.

1. Comparative Example 1, wherein the requirement (B-2) is not satisfied, reveals high glossiness and high transparency.
2. Comparative Example 2, wherein the requirements (A-3) and (A-4) are not satisfied, reveals high glossiness and high transparency.
3. Comparative Example 3, wherein the requirement (A-3) and (A-4) are not satisfied, reveals high glossiness, high transparency and insufficient tear strength.
4. Comparative Example 4, wherein the requirement (B-2) is not satisfied, reveals high transparency.

TABLE 1

Requirements (A-1) to (A-4) for component (A)

| Components | (A-1) MFR(g/10 min) | (A-2) d(Kg/m³) | (A-3) Cx | A-4 a(wt %) | Right side of equation (2) |
|---|---|---|---|---|---|
| (A1) | 4.0 | 920 | 0.86 | 1.0 | 3.1 |
| (A2) | 2.0 | 912 | 0.57 | 9.2 | 5.7 |
| (A3) | 2.0 | 919 | 0.78 | 8.7 | 3.6 |

TABLE 2

| Components | Requirements (B-1) and (B-2) for component (B) | |
|---|---|---|
| | (B-1): MFR(g/10 min) | (B-2): b(wt %) |
| (B1) | 3.0 | 15 |
| (B2) | 1.5 | 19 |
| (B3) | 7.0 | 25 |
| (B4) | 1.5 | 10 |
| (B5) | 1.9 | 0 |

TABLE 3

| Examples | 1 | 2 | 3 | 4 | 5 | 6 | 7 |
|---|---|---|---|---|---|---|---|
| Components | | | | | | | |
| (A1) | 90 | 95 | 90 | 70 | 95 | 90 | 70 |
| (B1) (b = 15 wt %) | 10 | — | — | — | — | — | — |
| (B2) (b = 19 wt %) | — | 5 | 10 | 30 | — | — | — |
| (B3) (b = 25 wt %) | — | — | — | — | 5 | 10 | 30 |
| Diatom earth | 0.5 | 0.5 | 0.5 | 0.5 | 0.5 | 0.5 | 0.5 |
| Erucic amide | 0.15 | 0.15 | 0.15 | 0.15 | 0.15 | 0.15 | 0.15 |
| Requirement (B-2) | | | | | | | |
| 0.2 × WB + 10 (Note 1) | 12 | 11 | 12 | 16 | 11 | 12 | 16 |
| 0.7 × WB + 10 (Note 2) | 17 | 13.5 | 17 | 31 | 13.5 | 17 | 31 |
| Properties of films | | | | | | | |
| Haze (%) | 36 | 65 | 60 | 33 | 58 | 56 | 38 |
| Gloss (%) | 24 | 10 | 12 | 23 | 11 | 12 | 22 |
| Tear strength (kN/m) | 151 | 151 | 149 | 107 | 146 | 141 | 120 |

Note 1
Right side of equation (3)
Note 2
Right side of equation (6)

TABLE 4

| Comparative Examples | 1 | 2 | 3 | 4 |
|---|---|---|---|---|
| Components | | | | |
| (A1) | 90 | — | — | 90 |
| (A2) | — | 90 | — | — |
| (A3) | — | — | 90 | — |
| (B2) (b = 19 wt %) | — | 10 | 10 | — |
| (B4) (b = 10 wt %) | 10 | — | — | — |
| (B5) (b = 0 wt %) | — | — | — | 10 |
| Diatom earth | 0.5 | 0.5 | 0.5 | 0.5 |
| Erucic amide | 0.15 | 0.15 | 0.15 | 0.15 |
| Requirement (B-2) | | | | |
| 0.2 × WB + 10 (Note 1) | 12 | 12 | 12 | — |
| 0.7 × WB + 10 (Note 2) | 17 | 17 | 17 | — |
| Properties of films | | | | |
| Haze (%) | 24 | 25 | 28 | 7 |
| Gloss (%) | 48 | 39 | 37 | — |
| Tear strength (kN/m) | 148 | 165 | 78 | — |

(Note 1)
Right side of equation (3)
(Note 2)
Right side of equation (6)

What is claimed is:

1. A resin composition comprising:
   (A) from 1 to 99% by weight of a copolymer, which comprises an ethylene unit and an α-olefin unit of 3 to 12 carbon atoms, and
   (B) from 99 to 1% by weight of a copolymer, which comprises an ethylene unit and a unit of a compound having a carbon-carbon double bond and an oxygen atom, provided that the sum of the copolymer (A) and the copolymer (B) is 100% by weight, wherein the copolymer (A) satisfies the following requirements (A-1) to (A-4), and the copolymer (B) satisfies the following requirements (B-1) and (B-2),
   (A-1): a melt flow rate (MFR) is from 0.1 to 50 g/10 min,
   (A-2): a density (d) is from 880 to 935 Kg/m³,
   (A-3); a composition distribution variation coefficient (Cx) represented by the following equation (1) is not more than 0.5, $$Cx = \sigma/SCBave \qquad (1)$$

wherein σ is a standard deviation of composition distribution, and SCBave is an average branching degree, (A-4): a content (a) of cold xylene-soluble portion in terms of % by weight based on the weight of the copolymer (A) and the density (d) satisfy the following inequality (2), $$a < 4.8 \times 10^{-5} \times (950-d)^3 + 10 - 6 \times (950-d)^4 + 1 \qquad (2)$$

(B-1): a melt flow rate (MFR) is from 0.01 to 50 g/10 min, and (B-2); a content (b) of a unit of a compound having a carbon-carbon double bond and an oxygen atom in terms of % by weight based on the weight of the sum of the ethylene unit and the unit of a compound having a carbon-carbon double bond and an oxygen atom, and a content (WB) of the copolymer (B) in the resin composition in terms of % by weight based on the weight of the sum of the copolymer (A) and the copolymer (B) satisfy the following inequality (3), $$50 > b > 0.2 \times W8 + 10 \qquad (3).$$

2. A glove comprising the resin composition according to claim 1.

3. A resin composition according to claim 1, wherein copolymer (A) is produced with a metallocene catalyst.

4. A film comprising the resin composition according to claim 3.

5. The film according to claim 3, wherein a haze value of the film is more than 20%, and a gloss value thereof is less than 30%.

6. The film according to claim 4, wherein the film is for packaging sanitary goods.

\* \* \* \* \*